Figure 1:
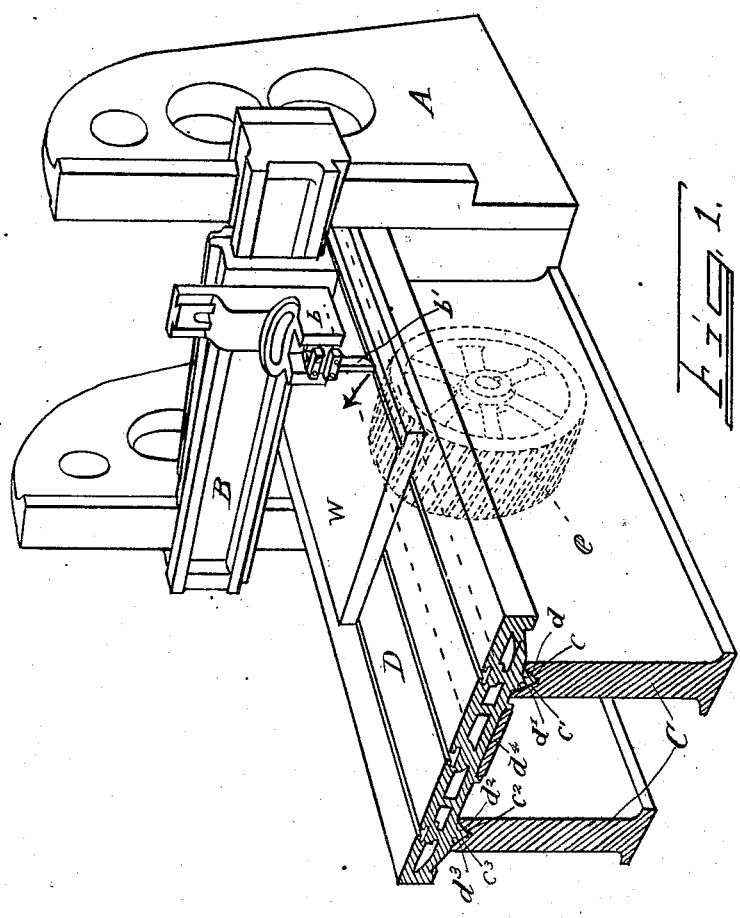

May 6, 1924.

F. E. CARDULLO 1,493,145

DRIVING GEAR FOR METAL PLANERS

Filed July 7, 1923

3 Sheets-Sheet 1

INVENTOR:
Forrest E. Cardullo

BY Walter A. Knight
ATTORNEY.

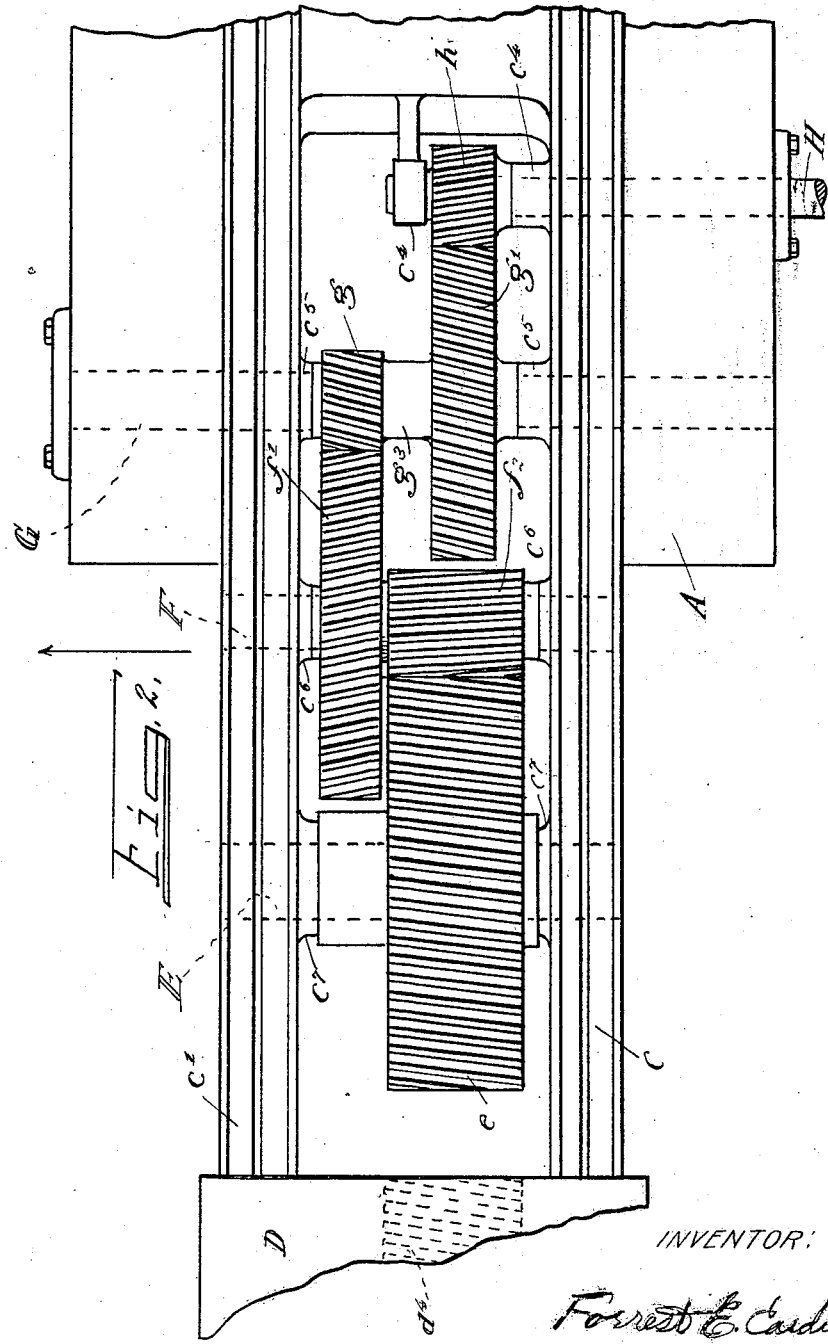

May 6, 1924.
F. E. CARDULLO
1,493,145
DRIVING GEAR FOR METAL PLANERS
Filed July 7, 1923    3 Sheets-Sheet 3
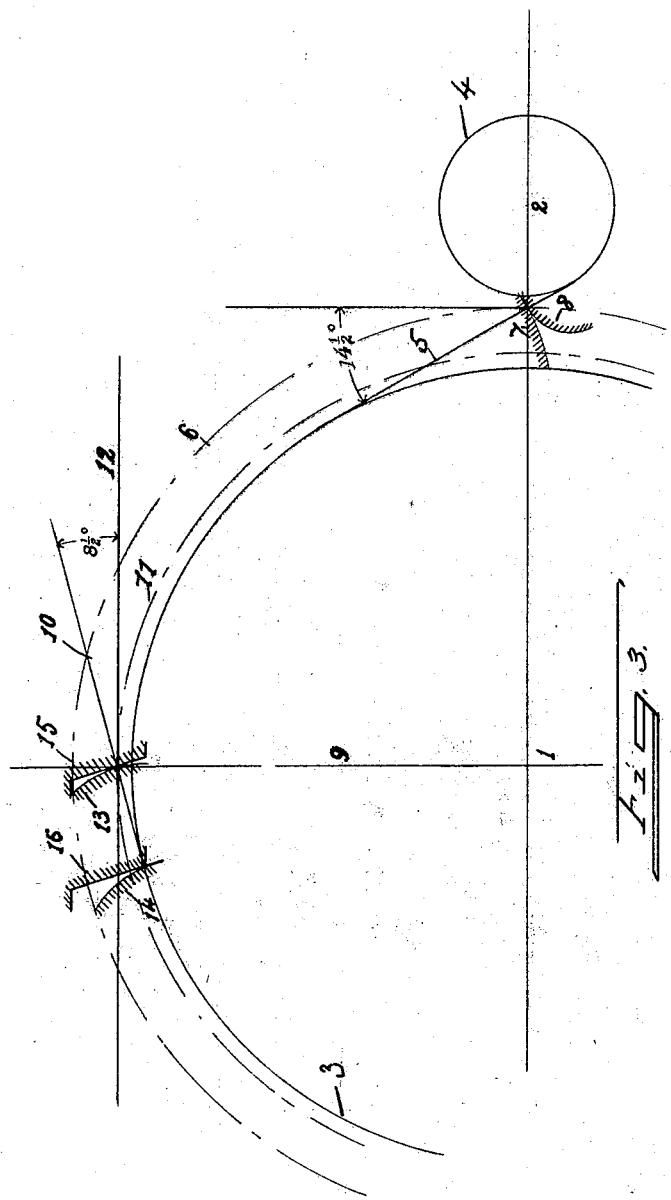
INVENTOR:
Forrest E. Cardullo
BY
Walter A. Knight
ATTORNEY.

Patented May 6, 1924.

1,493,145

UNITED STATES PATENT OFFICE.

FORREST E. CARDULLO, OF CINCINNATI, OHIO, ASSIGNOR TO THE G. A. GRAY COMPANY, OF CINCINNATI, OHIO, A CORPORATION OF OHIO.

DRIVING GEAR FOR METAL PLANERS.

Application filed July 7, 1923. Serial No. 650,001.

*To all whom it may concern:*

Be it known that I, FORREST E. CARDULLO, a citizen of the United States, residing at Cincinnati, in the county of Hamilton and State of Ohio, have invented new and useful Improvements in Driving Gears for Metal Planers, of which the following is a specification.

Metal planers are provided with reduction gearing transmitting power from the pulley or motor shaft, running at a fairly high speed, to a work table which runs at speeds ranging from about 20 to 120 feet per minute. The purpose of this gearing is to reduce the speed and increase the driving power applied to the work table.

It is advantageous to employ for this purpose helical gearing, which gives greater smoothness of motion and longer life than spur gearing. Helical gearing, however, produces heavy end thrusts, and side thrusts against the table, and it is the purpose of my invention to retain the advantages and overcome the disadvantages of this gearing, besides obtaining smoother acting and stronger tooth forms.

My invention is illustrated in the accompanying drawings, in which

Fig. 1 is a perspective view of the planer with part of the bed, table and table rack cut away, and the bull gear showing in dotted lines, Fig. 2 is a plan view of the planer bed and gearing with part of the table showing, with the end of the rack dotted in, and part of the bed broken away, and Fig. 3 is a diagram showing the kinematic properties of the bull gear, bull pinion and rack, and angles not being drawn to scale, in order to avoid confusion.

Referring now to the drawings, A is the housing, and B the rail of a planer with tool holder $b$ and tool $b^1$ movable thereon. The bed C has V shaped ways with guiding surfaces $c$, $c^1$, $c^2$, $c^3$. The work table D has V's with sides $d$, $d^1$, $d^2$ and $d^3$ adapted to reciprocate in the said ways. The work W is clamped to the work table D in the usual ways.

The gearing employed is similar in a general way to that usually employed for driving planers. However, I make use of several well known properties of gearing not hitherto employed in planer drives in order to secure smooth action. All the gears are helical in order to secure enduring smoothness of motion for reason already well known in the art. I employ preferably teeth of full length, of 14½ degrees pressure angle, and of true involute form. In order to secure smooth action and stronger pinion teeth and to eliminate interference, I prefer to make the addenda of the pinion teeth about three times as great as the addenda of the gear teeth.

To the under side of the work table is fixed a left hand helical rack $d^4$. Journaled in the bed C are shafts E, F, G and H. On E is mounted the right hand helical gear $e$ commonly called the bull gear, which meshes with and drives rack $d^4$. Mounted on shaft F is left hand helical pinion $f^2$, meshing with and driving gear $e$. To the extended hub of pinion $f^2$ is securely fastened left hand helical gear $f^1$. Mounted on shaft G is right hand helical pinion $g$ meshing with and driving gear $f^1$. To the extended hub $g^3$ of pinion $g$ is securely fastened right hand helical gear $g^1$. Meshing with $g^1$ is left hand helical pinion $h$ which is securely fastened to the motor or pulley shaft H.

During the cutting stroke of the planer, gear $e$ revolves to the right, as seen in Figure 2, the other gears of the train revolving in corresponding directions, being driven by shaft H, which during the cutting stroke revolves in the direction shown thereon by the arrow. Since the cutting tool is almost always fed in the direction shown by the arrow in Figure 1, (i. e. away from the operator), it exerts a pressure upon the work tending to push it and the table in the direction of the arrow. By making the bull gear $e$ a right hand helix, of the proper angle (i. e. about 5 degrees 40 minutes) the bull gear will exert upon the table a thrust practically equal and opposite to the feed pressure of the tool upon the work, thus relieving the ways of unbalanced pressure from this cause. The amount of this feed pressure varies, but since the average feed pressure is about ten per cent of the cutting pressure, the angle given will counteract this pressure in the average case. The gear $e$ is an idler gear and therefore the pinion $f^2$ exerts upon it an end thrust practically equal to that exerted by it upon the rack. This gear therefore, exerts almost no unabsorbed end thrust, and turns freely between bosses $c^7$ $c^7$ without exerting pressure upon either of them, except a very slight amount due to journal friction and to the fact that the bull gear has two pitch circles, as is later explained.

It will be observed that the end thrust exerted by gear $e$ upon pinion $f^2$ is opposite in direction to the end thrust exerted by pinion $g$ upon gear $f^1$. The driving pressure of pinion $f^2$ upon gear $e$ is much greater than the driving pressure of pinion $g$ upon $f^1$, but the helical angle of $f^1$ is greater than that of $f^2$. As a result a large proportion of the end thrust upon $f^2$ is transmitted to pinion $g$. Similarly the end thrust exerted by gear $f^1$ upon pinion $g$ is opposite to that exerted by pinion $h$ upon gear $g^1$, and a portion of it is transmitted to pinion $h$. In this way the end thrusts of the various gears are made to counteract one another, so that the end thrust of pinion $f^2$ is distributed between the thrust bearings of shafts F, G and H, being taken up by bosses $c^4$, $c^5$ and $c^6$.

During the return stroke the shafts and gearing revolve in the opposite direction and the end thrusts are accordingly reversed. The amount of power required to return the table is slight and these end thrusts are not serious.

In order to make the faces of the gears as wide as possible thus obtaining additional strength and smoothness of motion, the bull gear and rack are moved from the central position toward the operating side of the machine. This puts the gear and rack more nearly in line with the forces ordinarily acting upon the table, since the operator usually places the work on the operating side of the machine where it is most convenient for him.

In order to produce smooth action between the bull gear $e$ and the rack $d^4$, and to reduce the tendency of the gear to lift the rack and table, I make use of a property of involute gearing which enables me to reduce the pressure angle and addendum of the rack by reducing its pitch.

Referring to Figure 3, 1 is the center of rotation of the bull gear $e$, while 2 is the center of rotation of the bull pinion $f^2$. The teeth of these gears are so cut that the base circles are respectively 3 and 4. The common tangent 5 of these base circles intersects the line of centers 1—2 on the bull gear pitch circle 6. The involute 7 unwrapped from the base circle 3 is the face of a bull gear tooth, while involute 8 unwrapped from base circle 4 is the face of a pinion tooth. Involutes 7 and 8 always make contact at some point along line 5. Line 5 makes an angle of $14\frac{1}{2}$ degrees with the tangent to the pitch circle 6 at the point of intersection of 5 and 6. This $14\frac{1}{2}$ degrees is known as the pressure angle of the gears.

The vertical line 9 is the line of centers of the bull gear and rack (i. e. a line perpendicular to the line of motion of the rack and passing through point 1). Line 10 is tangent to base circle 3, and makes an angle of $8\frac{1}{2}$ degrees (the desired pressure angle between bull gear and the rack) with the line of motion of the rack.

Line 10 intersects line of centers 9. Through the intersection of lines 9 and 10 are drawn circle 11 with center at 1, which is the pitch circle of the bull gear when meshing with the rack, and line 12, which is the pitch line of the rack and parallel with the line of motion of the rack. 13 and 14 are involutes unwrapped from base circle 3 which are the faces of successive gear teeth. Tangent to these involutes, and normal to line 10 are straight lines 15 and 16 which are the faces of successive rack teeth. The circular pitch of the pinion $f^2$ and of the bull gear $e$ when meshing with pinion $f^2$ is equal to the distance measured along pitch circle 6 between the intersections of involutes 13 and 14 with this pitch circle. The circular pitch of the rack, and of the bull gear when meshing with the rack, is equal to the distance measured along pitch circle 11, between the intersections of involutes 13 and 14, with pitch circle 11, which is equal to the distance measured along line 12 between the intersections of tooth faces 15 and 16 with this line. The axial pitch (i. e. the distance measured along a line through the teeth and parallel to the axes, between the intersections of the said line with successive tooth surfaces) will be the same for pinion $f^2$, gear $e$, and rack $d^4$, but the helical angle of the teeth at the pitch circle of pinion $f^2$ is greater than the helical angle of the rack, since the circular pitch is greater. It will be noted that the rack teeth must be formed so that their surfaces will be perpendicular to line 10, whereas if the rack teeth were made with the same circular pitch as the teeth of pinion $f^2$, lines 15 and 16 would make angles of $14\frac{1}{2}$ degrees with the line of centers 9.

I claim as my invention and desire to secure by Letters Patent of the United States:

1. A drive for a metal planer, having in combination a planer table having on its under side a single helical rack, a helical gear meshing with and driving the said rack, and a helical pinion meshing with and driving said gear, the hands and angles of the helices being so arranged that the end thrust transmitted by the gearing to the table substantially balances the normal side thrust of the cutting tool.

2. A drive for a metal planer having in combination a planer table having on its under side a single helical rack, and a train of helical gears from the source of power to the said rack, the hands and angles of the helices being adapted to substantially balance the normal side thrust of the cutting tool and to counterbalance therewith the end thrusts of the several gears.

3. A drive for a metal planer having in combination a planer table carrying on its under side a single left hand helical rack, a right hand helical gear to mesh with and drive the said rack, a left hand helical pinion to mesh with and drive the said gear, a left hand helical gear fixed to said pinion, a right hand helical pinion to mesh with and drive said gear, a second right hand helical gear fixed to said right hand helical pinion, and a second left hand helical pinion to mesh with and drive said gear.

4. A drive for a metal planer having in combination a planer table, a rack with teeth of low pressure angle fixed to the underside of the said table, a gear adapted to mesh with and drive the said rack, and a pinion of higher pressure angle than the rack, adapted to mesh with and drive the said gear.

5. A drive for a metal planer having in combination a planer table, a left hand helical rack with teeth of low pressure angle fixed to said table, a right hand helical gear adapted to mesh with and drive said rack, and a left hand helical pinion of higher pressure angle than the rack, adapted to mesh with and drive said gear.

6. A drive for a metal planer having in combination a planer table and a single left hand helical rack fixed to the under side thereof and nearer to the operating side of the planer than to the other side.

In testimony whereof I have hereunto set my hand.

FORREST E. CARDULLO.